(12) United States Patent
Fracas et al.

(10) Patent No.: US 9,895,022 B2
(45) Date of Patent: Feb. 20, 2018

(54) THAWING APPLIANCE

(71) Applicant: Electrolux Professional S.p.A., Pordenone (IT)

(72) Inventors: Omar Fracas, Fontanafredda (PN) (IT); Luciano Andretta, Cittadella (PN) (IT); Deny Longo, Pordenone (IT)

(73) Assignee: Electrolux Professional S.p.A., Pordenone (IT)

( * ) Notice: Subject to any disclaimer, the term of this patent is extended or adjusted under 35 U.S.C. 154(b) by 198 days.

(21) Appl. No.: 14/675,918

(22) Filed: Apr. 1, 2015

(65) Prior Publication Data

US 2015/0272391 A1   Oct. 1, 2015

(30) Foreign Application Priority Data

Apr. 1, 2014 (EP) .................................... 14163043

(51) Int. Cl.

| | | |
|---|---|---|
| *A47J 39/00* | (2006.01) | |
| *A23L 3/365* | (2006.01) | |
| *A23B 4/06* | (2006.01) | |
| *A23B 5/045* | (2006.01) | |
| *A23B 7/04* | (2006.01) | |
| *F25D 31/00* | (2006.01) | |
| *F25D 23/12* | (2006.01) | |

(52) U.S. Cl.
CPC ............ *A47J 39/006* (2013.01); *A23B 4/066* (2013.01); *A23B 5/045* (2013.01); *A23B 7/04* (2013.01); *A23L 3/365* (2013.01); *F25D 23/12* (2013.01); *F25D 31/005* (2013.01); *F25B 2600/112* (2013.01); *F25D 2317/0683* (2013.01); *F25D 2400/02* (2013.01); *Y02B 40/32* (2013.01)

(58) Field of Classification Search
CPC combination set(s) only.
See application file for complete search history.

(56) References Cited

U.S. PATENT DOCUMENTS

| | | | |
|---|---|---|---|
| 3,107,501 A * | 10/1963 | Stickel | .................. F25D 21/002 |
| | | | 62/156 |
| 4,462,461 A | 7/1984 | Grant | |
| 4,674,402 A | 6/1987 | Raufeisen | |
| 4,936,377 A * | 6/1990 | DeVogel | ................ A47J 39/006 |
| | | | 126/400 |
| 5,069,273 A | 12/1991 | O'Hearne | |
| 5,326,578 A | 7/1994 | Yun | |
| 5,787,725 A * | 8/1998 | Shin | ...................... F25D 17/065 |
| | | | 62/276 |
| 6,802,369 B2 | 10/2004 | Zentner et al. | |

(Continued)

FOREIGN PATENT DOCUMENTS

| | | |
|---|---|---|
| GB | 1318575 A | 5/1973 |
| GB | 1429481 A | 3/1976 |
| WO | 2012/120410 A1 | 9/2012 |

*Primary Examiner* — Anne M Antonucci
*Assistant Examiner* — Renee LaRose
(74) *Attorney, Agent, or Firm* — Pearne & Gordon LLP

(57) ABSTRACT

A thawing appliance (1), in particular a food thawing cabinet, includes a food compartment (11), a refrigeration circuit (30) comprising a cooler (37), a heater (40) switchable between at least two conditions, and an air circulating element (21) circulating an airflow across the food compartment (11). The airflow passes through the heater (40) only a part of the airflow passes through the cooler (37).

17 Claims, 6 Drawing Sheets

(56) References Cited

U.S. PATENT DOCUMENTS

Figure 1:
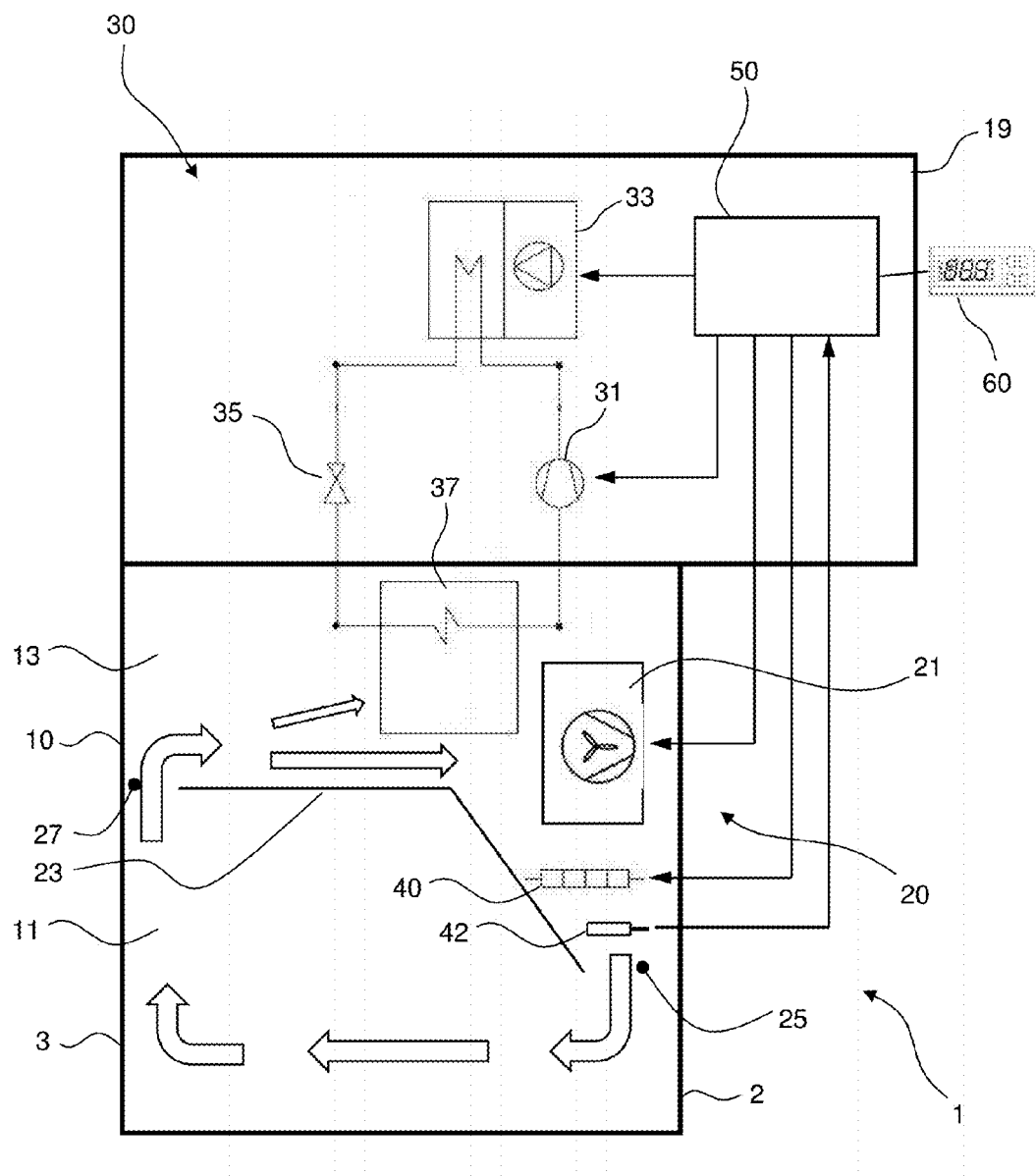

| | | | |
|---|---|---|---|
| 9,127,875 B2 * | 9/2015 | Hall | F25D 21/006 |
| 2004/0107726 A1 * | 6/2004 | Kim | F25D 17/045 |
| | | | 62/441 |
| 2015/0184917 A1 * | 7/2015 | Kim | F25D 17/062 |
| | | | 62/80 |

* cited by examiner

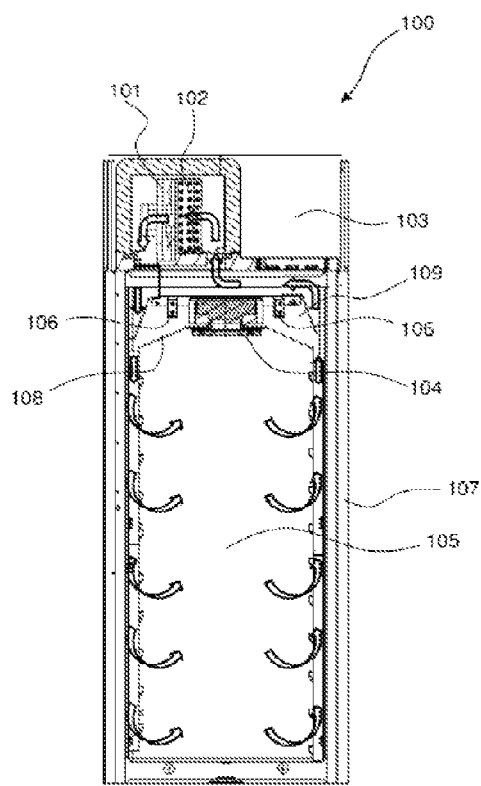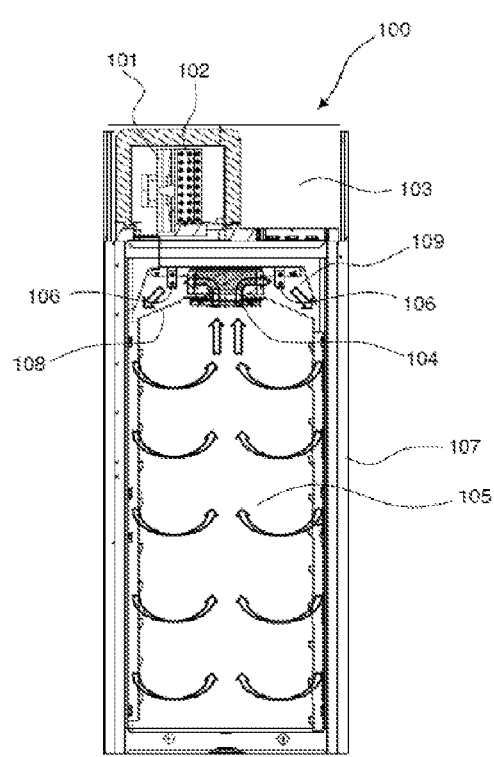
Fig. 7
(PRIOR ART)
Fig. 8
(PRIOR ART)

THAWING APPLIANCE

The present invention relates to a thawing appliance, and in particular to a food thawing cabinet.

A thawing appliance raises the temperature of the contents of a chamber, specifically of a food compartment, from a frozen to a cold state in a mode named "thawing mode" hereinbelow.

Although the contents of the chamber is usually food and this will be referred to hereinbelow, other contents such as beverage can also be handled by a food thawing cabinet.

A food thawing cabinet is such an appliance in the form of a case having a door or doors and one or more shelves.

Usually, a food thawing cabinet is also intended to store food in the same treatment compartment at a given cold temperature or range of temperatures, i.e.

a given temperature or range of temperatures below ambient temperature, in a mode named "holding mode" hereinbelow.

The invention is more in particular concerned with such an appliance having both a thawing mode and a holding mode. The appliance may also have a further mode of operation named "chilling mode" hereinbelow, wherein the temperature of food is (quickly) brought to the cold or frozen temperature; such a mode is not disclosed in detail hereinbelow because the invention lies elsewhere, and the changes to be made to what stated herein to allow such a mode are deemed within the skills of a skilled in the art.

Although food thawing cabinets having distinct or plural compartments for storing and/or thawing (and/or chilling) are known, the invention is mainly concerned with a food thawing cabinet having a single common compartment, and reference to a "food compartment" or "treatment compartment" or "food treatment compartment" will therefore be made hereinafter for the sake of brevity, without any limiting purpose.

Food thawing cabinets of the kind of concern herein are mostly used in professional environments such as restaurants, pubs and the like, but may also be used in a domestic environment.

Under term "thawing cycle", the treatment of a product batch in thawing mode from initial temperature to storage temperature is meant hereinbelow.

Usually, a thawing cycle is started by a user, who can often also select some parameters such as temperature and duration of the cycle. Conversely, usually the holding mode is started upon power-on of the appliance, and goes on unlimitedly in time (as in a refrigerator) apart from when it is temporarily taken over by a thawing cycle in thawing mode, even without any intervention by the user.

The holding mode and a thawing cycle usually take place by means of a temperature-controlled airflow within the thawing compartment.

A food thawing cabinet generally has a chamber that may be closed by a door and wherein there is said at least one treatment compartment; a ventilation system for circulating air within the treatment compartment; a heater for the thawing mode; a cooler for the holding mode; a controller; and a user interface for controlling operation of the food thawing cabinet through the controller.

In an food thawing cabinet 100 marketed by the same Applicant, as shown in FIG. 7 and FIG. 8, an axial fan 101 is provided coaxial and coextensive with an evaporator 102 of a refrigeration circuit (the other components not being shown) at a top chamber 103 housing the refrigeration circuit. Two radial fans 104 (centrifugal fans), only one of which is visible, are provided at the ceiling of a chamber 107 including a food compartment 105, and heaters 106 are provided close to the radial fans 106. A baffle 108 divides the chamber 107 into the food compartment 105 and a heating compartment 109 wherein the radial fans 104 and the heaters 106 are arranged. The top chamber 103 and the heating compartment 109 are in fluid communication with the food compartment 105.

During holding mode (see FIG. 7), the axial fan 101 is switched on so that cold air, cooled by evaporator 102, is forced from the top chamber 103 to the food compartment 105 downwardly along one side of the cabinet (the left side in FIG. 7), and air warmed by the stored product is output from the food compartment 105 to the top compartment 103, flowing upwards along the opposite side of the cabinet (the right side in FIG. 7). During thawing mode (see FIG. 8), on the other hand, the radial fans 104 and the heaters 106 are switched on so that warm air is forced to the food compartment 105 downwardly along both sides of the cabinet 100, and air cooled by the product being thawed is sucked centrally upwards from the food compartment 105. Thus, the airflow path is changed from holding mode to thawing mode, and the known food thawing cabinet 100 comprises a complex ventilation system, which however allows to provide two different airflow rates during the holding mode (a comparatively low flow rate) and during the thawing mode (a comparatively high flow rate).

In respect of this prior art, the Applicant has now recognized that the use of distinct fans for the holding mode and the thawing mode is costly and burdensome.

Food treatment appliances wherein heating/thawing and refrigeration/holding take place by a single fan are discloses e.g. in GB 1429481, U.S. Pat. No. 5,326,578, U.S. Pat. No. 4,462,461, GB 1318575 A, U.S. Pat. No. 5,069,273, and WO 2012/120410 A1. Also in U.S. Pat. No. 4,674,402, circulation of air for refrigeration and for thawing takes place by a same set of fans.

The Applicant recognized that in all these documents, the airflow generated by the fan(s) entirely flows through both the heater and the evaporator of the refrigeration circuit, and that this causes a great thermal inefficiency due to thermal inertia at switching on/off the two components particularly during heating operations.

U.S. Pat. No. 6,802,369 discloses a refrigerator including a quick chill and thaw system, the quick chill and thaw system including an air handler and a pan, the air handler being operable in at least one chill mode and at least one thaw mode, and a control system comprising an electronic controller coupled to the air handler. The controller is configured to position a first and a second damper to adjust airflow through the air handler; adjust the air handler to produce a constant temperature airstream in the pan; maintain a first constant temperature airstream in the pan to execute a chill mode when selected by a user; and maintain a second constant temperature airstream in the pan to execute a thaw mode when selected by a user. More specifically, by means of the dampers the airflow path is changed between the modes of operation, and in the thawing mode, cold air from a freezer compartment is allowed to enter the air handler.

In such a prior appliance, there are thus several dampers which require a complex control and may fail, as well as a mix of air from the two compartments, which through airborne food particles might deteriorate the organoleptic qualities of the food being thawed.

Starting from the above disclosed prior art arrangements, the object of the invention is to provide a simple food thawing cabinet, and notably a ventilation system thereof, avoiding complex parts prone to failure, and overall providing good performance.

Applicant found that the above object is achieved by providing a path of an airflow that is partly designed for heating purposes and partly designed for refrigerating purposes, and is free of dampers.

In a first aspect, the invention relates to a thawing appliance, in particular a food thawing cabinet, comprising:
a food compartment,
a refrigeration circuit comprising a cooler,
a heater switchable between at least two conditions,
an air circulating element circulating an airflow across the food compartment,
wherein the airflow passes through the heater, and wherein only a part of the airflow passes through the cooler.

In the present description and the attached claims, under "cooler", the cooling component of the refrigeration circuit is meant, intended to remove heat, in the specific case from the process airflow within the food compartment. In the case of a vapor-compression type refrigeration circuit, the cooler is the evaporator. An evaporator will be mostly referred to hereinbelow for the sake of brevity.

In the present description and the attached claims, under "switchable between at least two conditions" it is meant that a component may be switched off and switched on in at least one operating condition, or that it may be switched on in at least two operating conditions.

By these provisions, during the thawing mode a part of the airflow through the air circulating element—such as a fan which will be referred to hereinbelow for the sake of brevity—is advantageously not passed through the evaporator, which although being possibly switched off may still be cool due to thermal inertia. This therefore allows the performance during the thawing mode to be increased.

It is noted that during the holding mode, the fact that not all the airflow passes through the evaporator appears to be a technical drawback per se. The Applicant indeed overcame any related prejudice and recognized that, since holding mode is less critical because the work for removing heat during holding mode is less than the work for heating during thawing mode, the above noted drawback could be coped with in view of the advantage described above.

Advantageously, the food thawing cabinet is free of any damper to control the airflow during thawing and holding modes.

Preferably, the air circulating element is switchable between at least two conditions. Preferably, the air circulating element is always switched on and the two (or more) conditions differ in terms of fan speed. In a different embodiment, the air circulating element is selectively switched on or off. In a third embodiment, the air circulating element can be switched off, or switched on at two or more fan speeds.

By this provision, it is possible to switch the air circulating element between the two or more conditions, so as to change the airflow rate generated by it, according to the needs and in particular according to whether the appliance is operating in a thawing mode or a holding mode, or possibly a chilling mode.

Advantageously, the refrigeration circuit is switchable between at least two conditions. In particular, the refrigeration circuit may be selectively operable in an on mode and an off mode, and/or the on mode may comprise two or more different operating conditions.

By this provision, it is possible e.g. to switch the refrigeration off during a thawing mode so as to increase the efficiency of the appliance.

Preferably the airflow circulated by the air circulating element follows a same airflow path within an air processing compartment during a thawing mode and a holding mode of the appliance.

Preferably the entire airflow path passes through the heater.

Preferably a portion of a suction aperture or nozzle of the air circulating element faces a major face of the cooler.

Even more preferably, the cooler is not centered on the air circulating element.

In the present description and the attached claims, under "center of symmetry" or in short "center", a point is meant that is related to a geometrical figure or body in such a way that for any point on the figure or body there is another point on the figure or body such that a straight line joining the two points is bisected by the original point.

In the present description and the attached claims, under "axis of symmetry" or in short "axis" a straight line is meant with respect to which a body or figure is symmetrical.

In the present description and the attached claims, under "to center", "to be centered", the act of aligning two figures or elements or the status of two figures or elements of being aligned at their centers or axes is meant.

Still more preferably, the cooler and the air circulating element each have a horizontal axis, and are mutually arranged so that only a part, preferably the upper part of the suction aperture of the air circulating element forces air through the cooler, while another part, preferably the lower part of the suction nozzle of the air circulating element directly intakes the air coming from the food compartment.

However, other arrangements of the cooler and the air circulating element may be used within the scope of the present invention.

Preferably the air circulating element is a radial fan or centrifugal fan.

As is well known, centrifugal fans accelerate air radially, changing the direction (typically by 90°) of the airflow from their suction aperture or inlet to their outlet. More specifically, a centrifugal fan has a fan wheel composed of a number of fan blades, or vanes, mounted around a hub, that rotates on a shaft that passes through a fan case or housing. The airflow enters from the side of the fan wheel, from an axially arranged inlet, it turns usually 90° and accelerates due to centrifugal force as it flows over the fan blades, and exits the fan housing from an outlet arranged at the cylindrical surface of the case.

A radial or centrifugal fan allows the occupied space to be kept lower, especially in the height direction when mounted with a horizontal axis, than if an axial fan were used. A radial fan has a good flow rate and has good performance also when there are high pressure drops, as might be caused by obstacles like containers like pans, bowls, bottles and similar within the food thawing cabinet, better than if an axial fan were used.

A horizontal axis radial fan can be mounted on a wall of the cabinet, preferably at the top of a back wall of the cabinet, thus minimizing the occupied space within the chamber housing the treatment compartment.

Advantageously, the air path within the food compartment is of a back-to-front air path, as opposed to the side-to-side air path of the known food thawing cabinets. In this manner any shelf runners or shelf runner structure and any perforated ducts and/or diffusers within the food compartment may be distinct, dedicated components which can be thus designed more specifically to the intended use, and do not or only slightly hinder the air flow.

During holding mode, the air is cooled at the evaporator and forced downwards by the fan along the back of the food thawing cabinet, and the air warmed by the stored product rises upwards at the front of the food thawing cabinet. During thawing mode, air heated by heater is forced downwards by the fan along the back of the food thawing cabinet, and the air cooled by the product being thawed rises upwards at the front of the cabinet. In the first case, the forced airflow generated by the fan is low, but the spontaneous downwards motion of cold air and upwards motion of warm air helps the airflow. Perforated ducts may thus be avoided altogether, especially at the front of the cabinet where there is the door.

As an alternative, within the food compartment, the air may flow through suitable perforated ducts and/or diffusers that ensure air uniformity on the stored product.

Preferably, the appliance comprises a controller for controlling components of the appliance.

Preferably, the air circulation element is a variable speed fan, controlled by the controller.

During the holding mode, the fan represents a drawback from a thermal point of view, in that it heats the surrounding space somehow. By providing for a variable speed fan, that can be off or operated at comparatively low speed during the holding mode with respect to the thawing mode, its heating contribution can be kept enough low to be easily taken away by the cooler.

More preferably, the airflow of the fan is controllable by a PWM (pulse width modulation) signal output by the controller.

As is well known, pulse-width modulation is a modulation technique wherein the width (or duration) of each pulse is based on modulator signal information, and allows the control of the power supplied to electrical devices. Use of a PWM signal to control the fan ensures to easily obtain desirably high flow rates for thawing mode and desirably low flow rates for holding mode.

Moreover, the provision of a PWM (pulse width modulation) signal to control the fan allows the airflow rate to be easily adjusted to the features of the product being stored and/or thawed, avoiding a too intense airflow that could damage the organoleptic qualities of unwrapped product.

As an alternative, the fan may be controlled through a signal variable within a range of voltage and/or current.

Preferably a temperature sensor is arranged within a path of the air flow circulated by the air circulating element. The temperature sensor outputs the detected temperature to the controller which in turn controls the controllable heater, the compressor and the air circulating element, so that a feedback operation of the food thawing cabinet is achieved.

Preferably the heater is arranged within a path of the air flow circulated by the air circulating element, so that air is forced through the heater before passing through the food compartment, the controller controlling the heater.

The controllable heater is driven on during thawing mode, and is preferably driven off during holding mode and a possible chilling mode by the control circuit, either automatically or manually through the user interface.

More preferably, the controllable heater is driven with a dynamic duty cycle during the thawing mode.

The controllable heater preferably comprises an electric element such as a resistor.

More preferably the controllable heater comprises a pair of electric elements such as a pair of resistors.

Preferably, the controller operates during the thawing mode with a dual threshold about a setpoint. With such an operation, the heater is switched on when the temperature lowers below a low threshold below the setpoint and is switched off when the detected temperature rises above the setpoint; while the compressor is switched on when the detected temperature rises above a high threshold above the setpoint and is switched off when the detected temperature lowers below the setpoint.

More preferably, in a rising time period while the temperature rises from the low threshold to the setpoint, the controller dynamically controls the duty cycle of the heater.

This provision allows the thawing appliance to be more versatile insofar as the contents to be thawed is concerned, in that even if the thermal inertia of the contents is very low—such as for example in the case of much less product than full capacity—temperature peaks above the high threshold are more limited in number, and consequently the switching on of the compressor—what is a thermal inefficiency during thawing—takes place more rarely.

Even more preferably, during the rising time period the output of the heater is calculated periodically based on the currently detected temperature.

More specifically, the duty cycle of the heater is calculated at least periodically so as to be proportional to the ratio between (i) the temperature difference between the setpoint and the temperature detected each time, and (ii) the temperature difference between the setpoint and the low threshold.

Even more preferably, the heater comprises two heating elements and the two heating elements may be operated alternatively and/or simultaneously during said rising time period.

When there are two heating elements, and a first rising time period of a thawing cycle lasts less than a preset time period, then in any further rising time periods a single heating element is used, which duty cycle is calculated at least periodically so as to be proportional to the above ratio.

More preferably, during one thawing cycle the controller initially dynamically controls the duty cycle of both heating elements while an air flow temperature raises from the low threshold to the setpoint, and according to whether this raise occurred in a time shorter than or longer than a preset time period, the controller later, within the same thawing cycle, dynamically controls the duty cycle of either one or both heating elements while the air flow temperature raises again from the low threshold to the setpoint.

According to a provision that is believed to be new and inventive also per se, independently of the features of the above aspect of the invention, the food thawing cabinet comprises a displaceable fake bottom to adjust the internal volume of the food compartment to the quantity of product to be thawed and/or stored. This allows the efficiency of the appliance to be kept high even with a small product batch, and thus allows important energy savings.

Preferably, the fake bottom is basin-like in order to also act as a container for liquids that might form during the thawing operation, especially with unwrapped product.

Preferably the shelf runner structure is so configured that the fake bottom can be arranged at least in one intervening position between the top and the bottom of the food compartment, more preferably in two intervening positions so as to define an internal volume equal to ⅔ and ⅓, respectively, of the total internal volume.

Even more preferably, the basin-like fake bottom may also be arranged in a position at the bottom of the processing compartment, so as to define an internal volume equal to the total internal volume, without the need of storing it outside the food thawing cabinet when no reduction of internal volume is desired.

Such a fake bottom displaceable between at least two positions differs from a shelf in that it tightens—within real world limits—the space above it from that below it.

Figure 2:
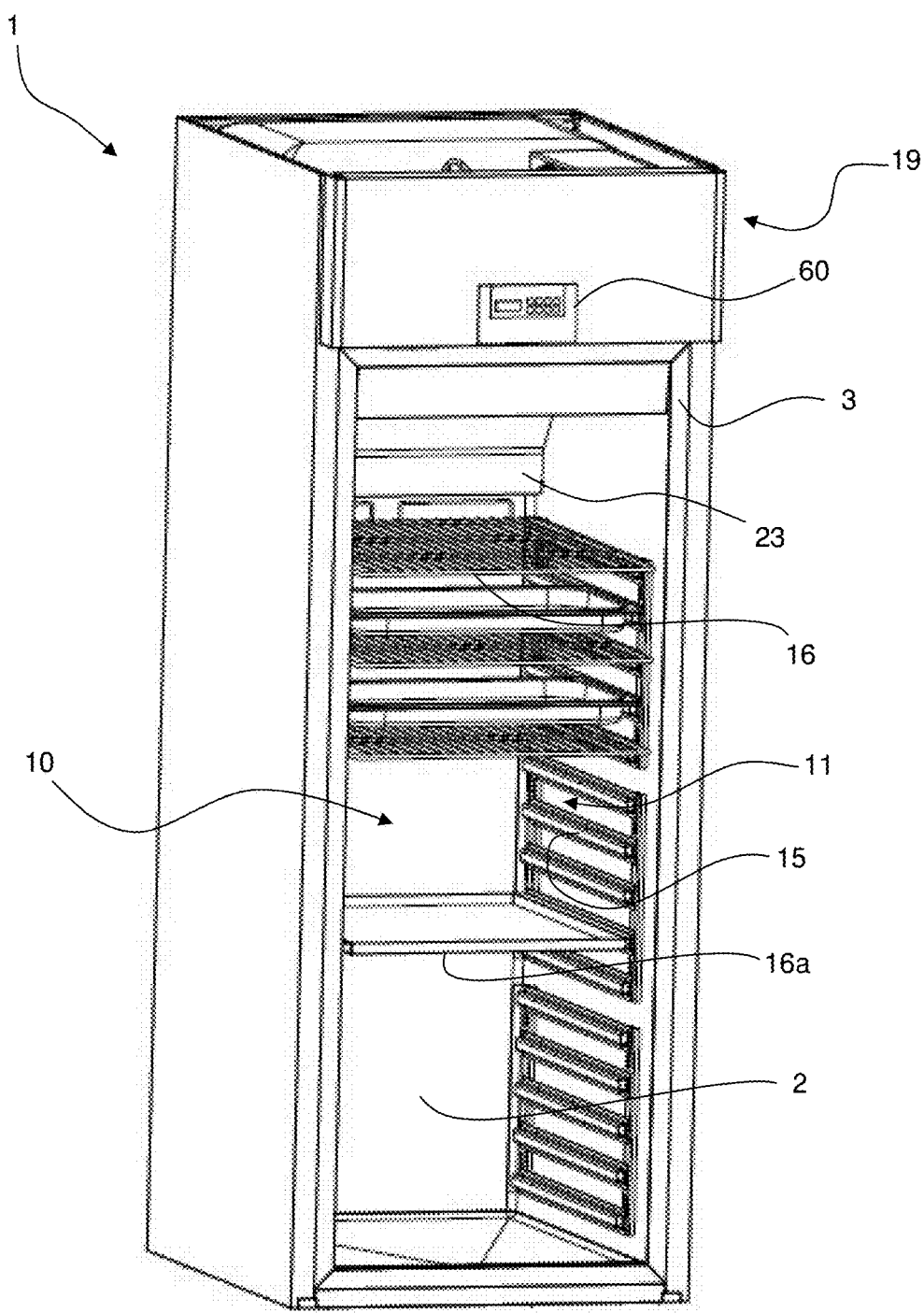
Figure 3:
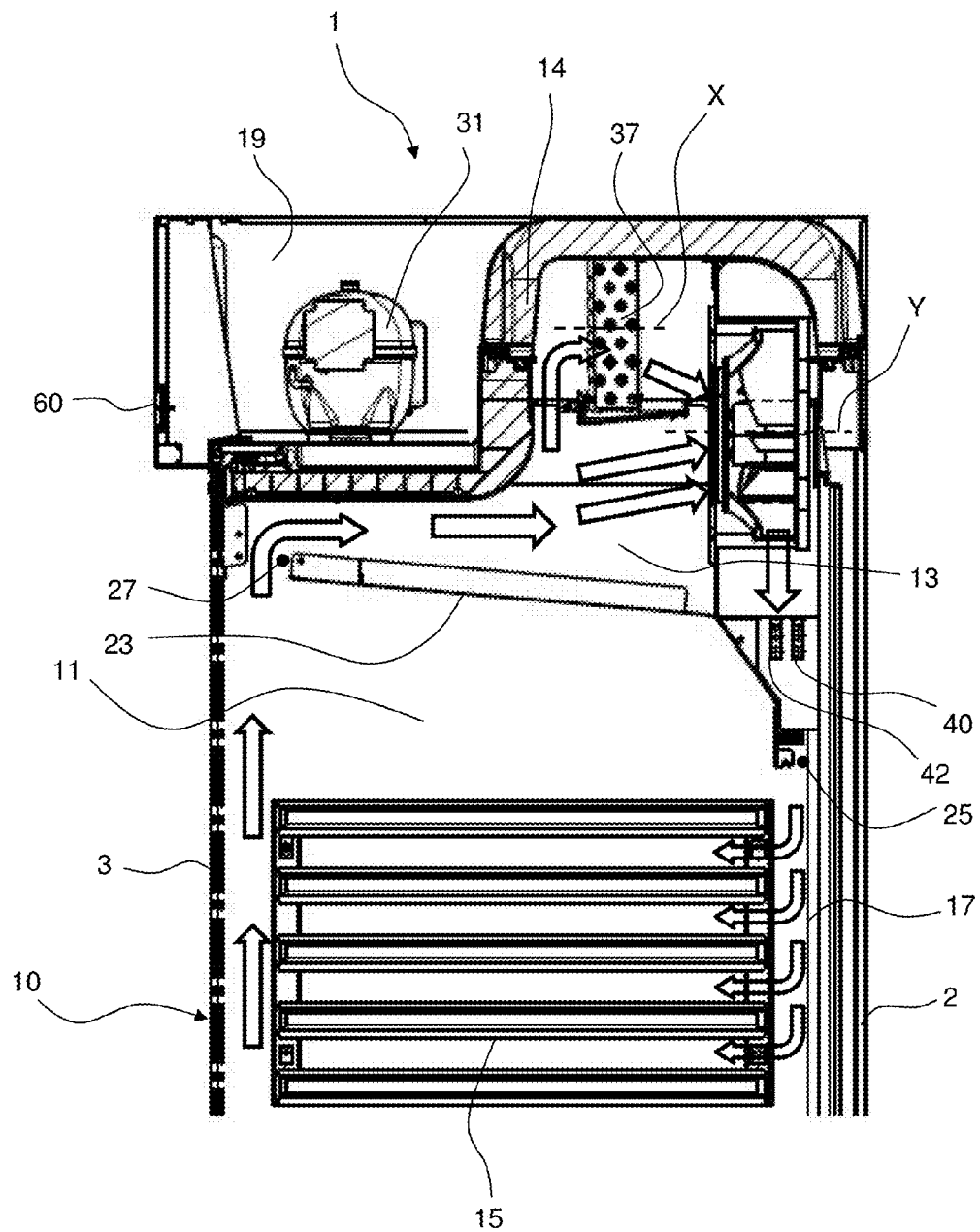
Figure 4:
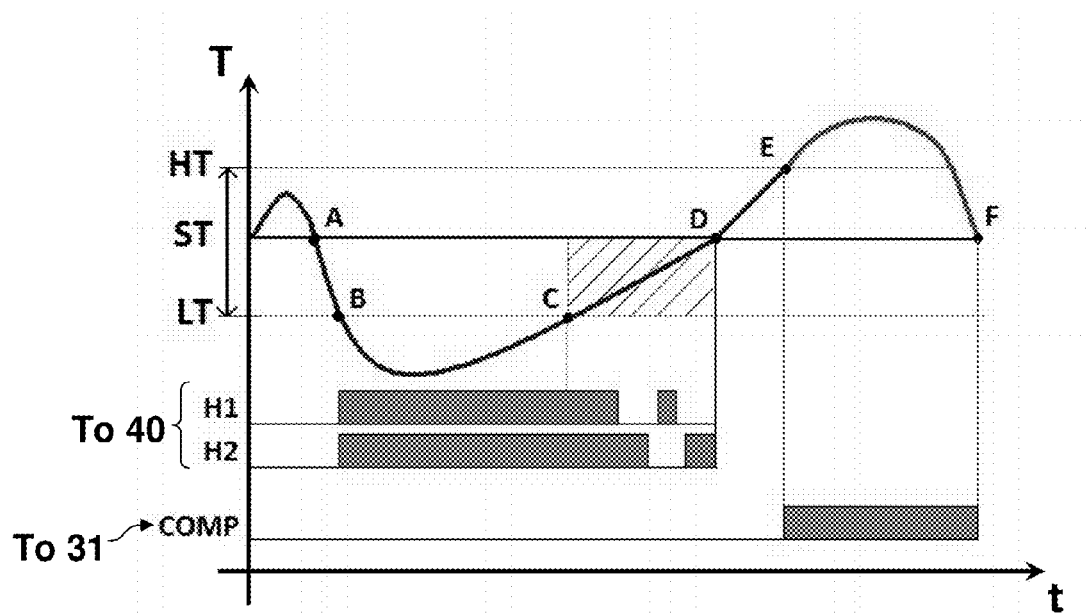
Figure 5:
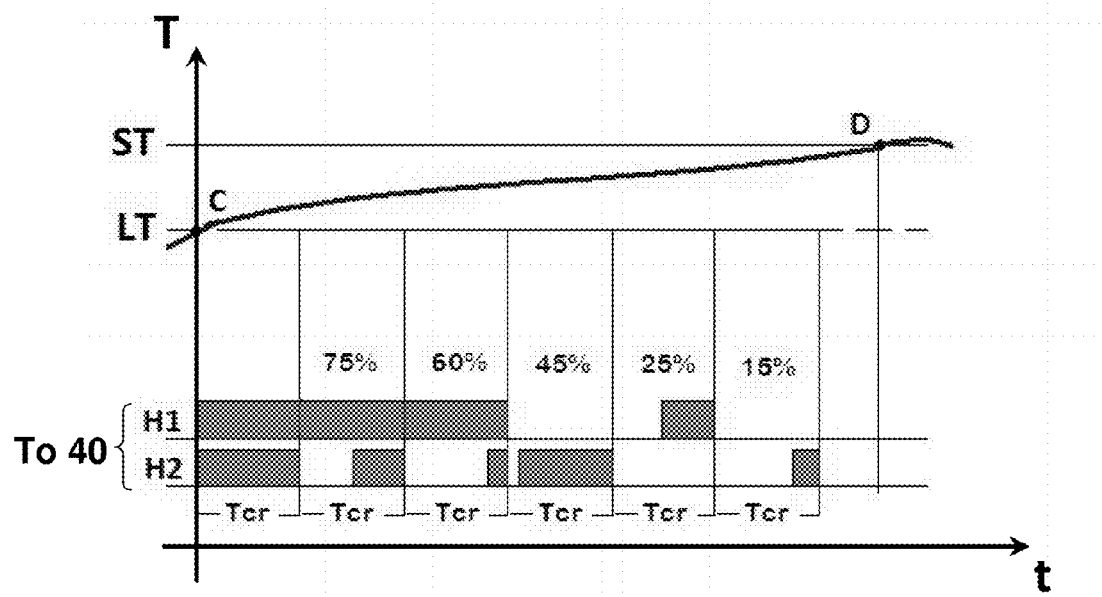
Figure 6:
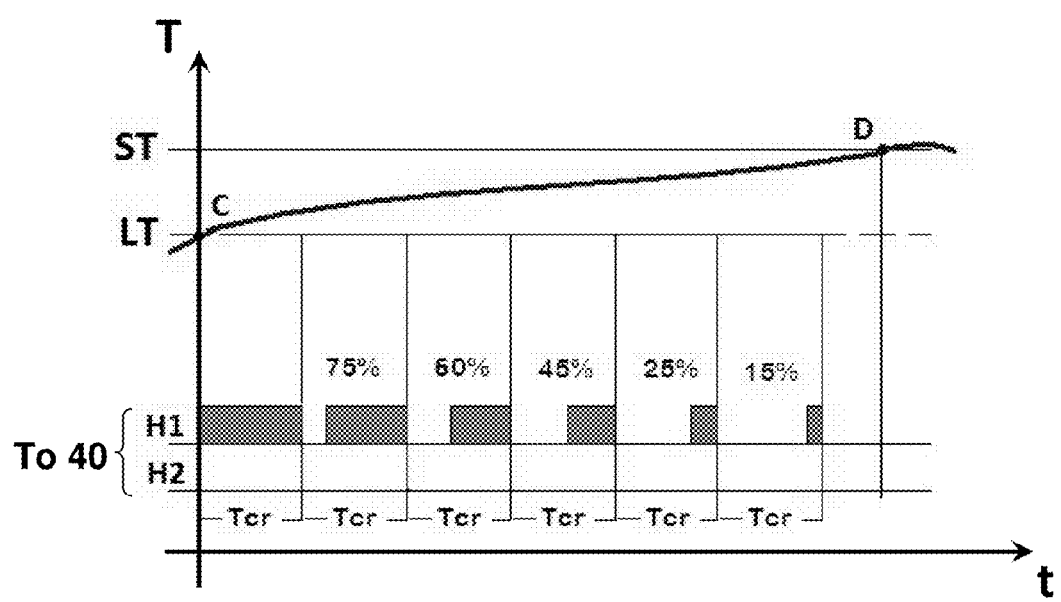

Features and advantages of the present invention will be more readily understood from the following detailed description of some advantageous embodiments thereof, which is provided below by way of non-limiting example with reference to the accompanying drawings, wherein:

FIG. 1 shows a diagram of the principle of operation of a thawing appliance according to the invention, FIG. 2 shows an embodiment of a food thawing cabinet according to the invention, FIG. 3 shows a longitudinal section across the upper part of the food thawing cabinet of FIG. 2, only showing some components thereof, FIG. 4-6 are diagrams relating to a thawing mode of operation of a thawing appliance according to the invention, FIG. 7, already described, shows a prior art food thawing cabinet, highlighting the airflow in a holding mode, FIG. 8, already described, shows the prior art food thawing cabinet of FIG. 7, highlighting the airflow in a thawing mode.

With reference to FIGS. 1-3, a thawing appliance or food thawing cabinet 1 according to the invention comprises a cabinet having a chamber 10 that may be closed by a door not shown in the figures.

The cabinet 1 according to the invention generally comprises a food compartment 11 or treatment compartment, a ventilation system 20 for circulating an airflow within the food compartment 11, a refrigeration circuit 30 designed to cool the airflow, and a heater 40 designed to heat the airflow.

The cabinet 1 preferably further includes a controller 50 designed to control operation of the cabinet 1 and its components.

The controller 50 is preferably connected to, or integrated with, a user interface 60 to input manual settings and/or to provide any output to the user.

User interface 60 is preferably accessible from the outside of the cabinet 1.

The refrigeration circuit 30 preferably uses a refrigeration cycle of the vapor-compression type, but may be of a different type, the minor changes to be made to what is disclosed herein being fully within the skills of a skilled in the art upon reading the present disclosure.

In the case of a vapor-compression type refrigeration circuit 30 as shown and as is well known, it comprises a compressor 31, a first heat exchanger 33 which is usually a condenser, a pressure lowering device 35 which is usually a capillary or an expansion valve, and a second heat exchanger 37 which is usually an evaporator, connected in the above order in a closed circuit wherein a refrigerant circulates. The circulating refrigerant, in the vapour state, is compressed and heated (or superheated) at the compressor 31; the heated vapour travels through the condenser 33 which cools it down and condenses it into a liquid; the liquid, cold refrigerant then passes through the pressure lowering device 35 where it evaporates at least in part; then the refrigerant is completely vaporized in the evaporator 37 by cooling what is desired to be refrigerated, herein a process airflow being blown by a fan 21—generally speaking, an air circulating element 21—of the ventilation system 20 across the evaporator 37 coil or tubes. The resulting refrigerant vapor returns to the compressor 31 to complete the thermodynamic refrigeration cycle. The condenser 33 is shown of the type associated with a fan, but this is not strictly necessary.

The evaporator 37 thus behaves as a cooler with respect to the process airflow, and will be sometimes broadly referred to as cooler 37 herein.

Preferably the components of the refrigeration circuit 30 apart from the evaporator 37 are arranged in a closed compartment or machinery chamber 19 (FIGS. 1, 2). Machinery chamber 19 is preferably but not necessarily housed in the upper part of the cabinet 1 as shown.

The food compartment 11 is more specifically part of an openable chamber 10, preferably but not necessarily arranged at the bottom of cabinet 1 in the embodiment shown. Openable chamber 10 is closed by a door (not shown), such as a hinged door.

Evaporator 37 of the refrigeration circuit 30 is preferably housed in openable chamber 10, more preferably at a ceiling thereof.

Machinery chamber 19 is thermally insulated from the openable chamber 10.

A runner structure 15 to support shelves 16 to hold the food within food compartment 11 is arranged at walls of the openable chamber 10 in the region of the food compartment 11.

Preferably, the shelves 16 may be displaced in several positions along the runner structure 15.

According to the invention, the lowermost movable shelf of the cabinet 1 is configured as a displaceable fake bottom 16a which can essentially tight seal the food compartment 11 above it from the space below of openable chamber 10, therefore adjusting the internal volume of the food compartment 11 to the quantity of product to be thawed and/or stored. This allows the efficiency of the cabinet 1 to be kept high even with a small product batch, and thus allows important energy savings.

Preferably, the fake bottom 16a is basin-like as shown, in order to also act as a container for liquids that might form during the thawing operation, especially with unwrapped product.

Preferably the shelf runner structure 15 is so configured that the fake bottom 16a can be arranged at least in one intervening position between the top and the bottom of the food compartment 11, more preferably in two intervening positions so as to define an internal volume equal to ⅔ and ⅓, respectively, of the total internal volume of the food compartment 11.

Even more preferably, the basin-like fake bottom 16a may also be arranged in a position at the bottom of the processing compartment 11, so as to define an internal volume equal to the total internal volume, without the need of storing it outside the cabinet 1 when no reduction of internal volume is desired.

The ventilation system 20 includes, besides said fan 21, a baffle 23 that divides the openable chamber 10 of the cabinet 1 into said food compartment 11 and an air processing compartment 13 wherein the fan 21 and the evaporator 37 are housed.

The fan 21 circulates an airflow across the food compartment 11.

An air inlet 25 to the food compartment 11 from the air processing compartment 13, and an air outlet 27 from the food compartment 11 to the air processing compartment 13 are formed by the baffle 23 and the internal walls of the openable chamber 10.

Preferably, as shown, air inlet 25 extends near and across a back wall 2 of the cabinet 1, and air outlet 27 extends near and across a front wall 3 of the cabinet 1, specifically at the door. The airflow inside the food compartment 11 is therefore back-to-front (within the food compartment 11), and therefore is hindered to a minimal extent by shelf runner structure 15 and shelves 16, much less than a side to side airflow that may be even blocked by the upper shelf.

The airflow may be free within food compartment 11, or perforated ducts and/or diffusers may be provided at the back and/or front walls of the cabinet 1, in fluid communication with air inlet 25 and air outlet 27, respectively.

Baffle 23 may be so shaped that the air inlet 25 has a decreasing section in the flow direction, so as to accelerate the airflow forced into the food compartment 11. Baffle 23 may be funnel-shaped.

Baffle 23 may also serve as a cover of the air processing compartment 13, which hides the components housed within the air processing compartment 13 to the view of a user.

Preferably, the fan 21 is housed downstream of the evaporator 37.

In the present description and the attached claims, terms "downstream" and "upstream" are used with respect to the direction of flow of the process airflow or of the refrigerant of the refrigeration circuit, as the case may be.

The heater 40 is preferably housed in the air processing compartment 13, more preferably downstream of fan 21, even more preferably at or within air inlet 25.

A temperature probe or sensor 42 is preferably housed in the openable chamber 10, more preferably in the air processing compartment 13 downstream of heater 40, still at or within air inlet 25.

The entire airflow circulated by the fan 21 into the food compartment 11 passes through the heater 40.

On the other hand, the mutual arrangement of the evaporator 37 and the fan 21 is such that only a part of the airflow circulated by the fan 21 into the food compartment 11 passes through the evaporator 37.

More specifically, the evaporator 37 is preferably hung from the ceiling of openable chamber 10, with its major faces extending parallel to the back and front walls 2, 3 of the cabinet 1, but the baffle 23 is spaced below the bottom of evaporator 37. By this arrangement, an upper portion of the airflow returning from the food compartment 11 and sucked by the fan 21 flows through the evaporator 37, while a lower portion of that airflow flows directly to the fan 21, without flowing through the evaporator 37.

The evaporator 37 has preferably a horizontal axis X as shown.

Preferably, the height of evaporator 37 extends about half the height of the air processing compartment 13.

Preferably, the ceiling of the openable chamber 10 has a step, being lower in a front region of the cabinet 1 and upper in a rear region of the cabinet 1, so that the openable chamber 10 is taller at its rear region than at its frontal region.

The machinery chamber 19 preferably extends above the shorter region of the openable chamber 10.

Preferably, the evaporator 37 is arranged at the taller portion of the openable chamber 10, spaced from the raising wall 14 of the ceiling's step.

Preferably, the fan 21 is arranged within the air processing compartment 13 along the back wall 2 of the openable chamber 10, above the air inlet 25, preferably above and upstream heater 40 and temperature sensor 42.

Preferably the fan 21 has a horizontal axis Y.

A suction aperture (see arrows entering the fan in FIG. 3) of the fan 21 opens towards the front wall 3 of the cabinet 1, and preferably a portion of the suction aperture of the fan 21 faces a back major face of the evaporator 37 (parallel to the back wall 2 of the cabinet 1).

The major face of the evaporator 37 preferably extends for almost the entire width of the cabinet 1.

The suction nozzle of the fan 21 preferably extends centrally of the fan 21.

Preferably, as shown, the evaporator 37 is not centered on the fan 21, rather they are mutually arranged so that only the upper part of the suction nozzle of the fan 21 forces air through the evaporator 37, while the lower part of the suction nozzle of the fan 21 directly intakes the air coming from the food compartment 11.

Preferably, the fan 21 is a radial fan, and is attached to the back wall 2 of the openable chamber 10 to minimize the space taken up. Also, in virtue of the bend by 90° of the airflow within the radial fan 21, the airflow is input from the evaporator 37 or from the space below evaporator 37 horizontally into the fan 21, and is output vertically downwards from the fan 21 and therefore input to the food compartment 11 without further bends, without the need for further baffles.

It is noted that the cabinet 1 is free of any damper or valve (apart from the possible pressure lowering device 35), and that the airflow circulated by the fan 21 follows a same airflow path within air processing compartment 13 during a thawing mode and a holding mode of the cabinet 1, better disclosed hereinbelow.

The fan 21 is preferably switchable between at least two conditions, more preferably it is a variable speed fan, controlled as better detailed below by controller 50.

More preferably, the airflow of the fan 21 is controllable by a PWM (pulse width modulation) signal output by the controller 50. As an alternative, the fan 21 may be controlled through a signal variable within a range of voltage and/or current, e.g. between 0 and 10 V.

Use of a PWM signal to control the fan ensures the desirable high flow rates for thawing mode, and the desirable low flow rates for holding mode.

Moreover, the provision of a PWM (pulse width modulation) signal to control the fan 21 allows the airflow rate to be easily adjusted to the features of the product being stored and/or thawed, avoiding a too intense airflow that could damage the organoleptic qualities of unwrapped product.

The heater 40 is switchable between at least two conditions, in particular it may be switched off or switched on, and may also be switched on in different conditions. The heater 40 preferably comprises one or a pair of electric elements, such as a pair of resistors, and is controlled as detailed below.

As stated in the introductory portion of the present disclosure, a thawing cycle is started through interface 60 by a user, who can often also select some parameters such as temperature and duration of the cycle. Conversely, usually the holding mode of operation is started upon power-on of the cabinet 1, and goes on unlimitedly in time (as in a refrigerator) apart from when it is temporarily taken over by a thawing cycle in thawing mode, even without any intervention by the user.

The controller 50 controls the components or devices of cabinet 1 to implement the thawing mode of operation, or to run thawing cycles, and to implement the holding mode of operation, based on the input by the user through the user interface 60, and may provide the user with information about the state and mode of operation of the cabinet 1 through the user interface 60.

As shown by arrows in FIG. 1, the controller 50, besides communicating with user interface 60, receives as an input the output of the temperature sensor or probe 42, and outputs controls for the fan 21, the heater 40 and the controllable components of the refrigeration circuit 30, namely the compressor 31 and a fan associated with the condenser 33, if present.

Specifically, during the holding mode the controller 50 drives the compressor 31 on so that a set temperature (e.g. as set through user interface 60) is maintained within the openable chamber 30, as measured by the temperature sensor 42. The controller 50 may also control the fan associated with the condenser 33 if provided for, and possibly the pressure lowering device 35. The operation of the refrigeration circuit 30 during the holding mode is conventional, and will not be described in detail.

The heater 40 is preferably driven off during the holding mode.

The controller 50 furthermore preferably controls the fan 21, during the holding mode, such that it operates at a comparatively low speed so as to circulate a comparatively low flow rate, the term of comparison being the thawing mode described below.

The controller 50 is for example designed to control the fan 21 so as to maintain, in holding mode, a flow rate between 300 and 400 m³/h by setting the fan speed at about 40%.

The controller 50 is preferably designed to maintain, in holding mode, a storage temperature within the food compartment 11 of cabinet 1 ranging between 0° C. and +5° C.

As far as the thawing mode is concerned, the cabinet 1 is preferably designed to accept product to be thawed at a frozen temperature ranging between −20° C. and −18° C.

The controller 50 is preferably designed to maintain, in thawing mode, a temperature-controlled airflow circulating through the food compartment 11 of maximum +15° C. This ensures safety in terms of avoiding bacterial proliferation.

The controller 50 is preferably designed to control the fan 21 so as to maintain, during the thawing mode, a comparatively high flow rate. The controller 50 is for example designed to control the fan 21 so as to maintain, in thawing mode, a flow rate between 1000 and 1200 m³/h by setting the fan speed at or close to 100%, namely three to four times the holding mode flow rate.

Specifically, during the thawing mode the controller 50 drives the heater 40 on so that a set temperature (e.g. as set through user interface 60) is maintained within the openable chamber 30, as measured by the temperature sensor 42.

During the thawing mode, the controller 50 drives the compressor 31 off most of the time, though it may drive it temporarily on if the temperature raises too much.

FIG. 4 is a diagram showing a representative pattern of the temperature of the circulating air flow, e.g. detected by the temperature sensor 42, and the status of control outputs of the controller 50 versus time during the thawing mode. More specifically, a control H1 of a first resistor of heater 40, a control H2 of a second resistor of heater 40, and a control COMP of the compressor 31 are shown. Controls H1, H2, COMP are diagrammatically shown as signals having a low state and a high state, the low state being associated with the controlled component being switched off, and the high state being associated with the controlled component being switched on.

As shown, preferably the controller 50 operates during the thawing mode with a dual threshold LT, HT about a setpoint ST. Thus, the controller 50 operates so that:

the heater 40 is switched on—controls H1 and/or H2 are high—when the temperature lowers below a low threshold LT below the setpoint ST—namely when the temperature passes point B;

the heater 40 is switched off—controls H1 and H2 are low—when the detected temperature rises above the setpoint—namely when the temperature passes point D;

the compressor 31 is switched on—thus the evaporator 37 cools down—when the detected temperature rises above a high threshold HT above the setpoint ST—namely when the temperature passes point E;

the compressor 31 is switched off—thus the evaporator 37 stops cooling down—when the detected temperature lowers below the setpoint ST—namely when the temperature passes point F.

As shown before point B, when the temperature is between the two thresholds LT, HT around the setpoint ST, neither the heater 40 nor the compressor 31 are operated, though the fan 21 is preferably operated.

It is noted that the thresholds LT, HT need not be equally spaced from the setpoint ST.

It will be understood that during a thawing cycle of a product batch, the temperature floats about the setpoint ST, either within the thresholds LT, HT or not, even several times, so that FIG. 4 only shows an exemplary short time frame within a thawing cycle.

It will also be understood that the rates of climb and of descent of the temperature are greatly dependent on the amount of product, the type of product, the initial temperature thereof, the setpoint ST etc., so that they are also variable within one thawing cycle of a product batch.

More preferably, in a rising time period (hatched in FIG. 4) while the temperature rises from the low threshold LT to the setpoint ST (from point C to point D), the controller 50 dynamically controls the duty cycle of the heater 40. More specifically, the duty cycle of the heater 40 is calculated at least periodically so as to be proportional to the ratio between (i) the temperature difference between the setpoint ST and the temperature detected each time, and (ii) the temperature difference between the setpoint ST and the low threshold HT.

With reference to FIG. 5, that shows the case of a heater comprising two resistors, between points C and D of FIG. 4 the controller 50 calculates, at the beginning of each interval Tcr, how much of the power available by the heater 40 is needed to raise the temperature from the current value to the setpoint ST, and sets the duty cycle of the heater resistors accordingly.

So, in the first interval Tcr immediately after point C the above ratio is 1 and the duty cycle of the heater 40 is 100% so that both resistors are on for the entire interval Tcr; in the second interval Tcr the above ratio is about 0.75 and the duty cycle of the heater 40 is 75%, so that the control H1 of the first resistor is on for the entire interval Tcr but the control H2 of the second resistor is on for only half the interval Tcr, etc.

This dynamic control of the duty cycle of the heater 40 allows to save energy and to avoid to raise too much, or too quickly, the temperature of the air flow circulating in the food compartment 11. This in turn avoids or helps avoiding unnecessary raises of the temperature above the high threshold HT, and therefore unnecessary switching on of the compressor 31.

As a further improvement, if during one thawing cycle a rising time period while the temperature rises from the low threshold LT to the setpoint ST lasts less than a preset time period, then in any further rising time periods (again from LT to ST) of the same thawing cycle, a single resistor of heater 40 is used, controlled as said at least periodically in a manner proportional to the above mentioned ratio.

FIG. 6 shows the case of such a second or subsequent rising time period wherein the pattern of the temperature is similar to that depicted in FIG. 5, but a single resistor is used, which duty cycle is dynamically controlled by control H1, while the other resistor is not used, as shown by control H2 being always low.

Thus, here the controller 50 calculates, at the beginning of each interval Tcr, how much of the power available by a single resistor of the heater 40 is needed to raise the temperature from the current value to the setpoint ST, and sets the duty cycle of that heater accordingly. By referring to the total power available from a single resistor instead of that available from both resistors, even less power is used and too quick temperature raises are even better avoided.

The controller 50 may be embodied by firmware, hardware and/or software modules suitably configured.

The evaporator 37 may also be arranged in said machinery chamber 19, an air duct (not shown) being provided for circulating air between the evaporator 37 and the food compartment 11.

The ducts for inputting the process airflow into the food compartment 11 and/or for ouputting the process airflow from the food compartment 10 may also be shaped as a runner structure to support at least in part one or more shelves 16 within the cabinet 1.

The airflow within the food compartment 11 may be front-to-back or side-to-side or follow any other direction.

The fan 21 may be mounted spaced from the walls of the cabinet 1, may be an axial fan, and/or may have a vertical or oblique axis.

The evaporator 37 may have a vertical or oblique axis, and may be arranged downstream of the fan 21.

The heater 40 may be arranged upstream of the fan 21.

The heater 40 may comprise a single electric resistor or more than two electric resistors.

The heater 40 may also be embodied by different means from an electric resistor(s).

The air processing compartment 13 and the food compartment 11 need not be part of a same openable chamber 10, and specifically a door of the cabinet 1 may only provide access to food compartment 11, not to air processing compartment 13. In such a solution, air processing compartment 13 may be accessed e.g. by removing a removable panel, for maintenance or repair.

A similar removable panel may provide access to the machinery chamber 19.

The cabinet 1 may also have plural food compartments with respective doors.

The provisions disclosed above in connection with a food thawing cabinet may be embodied in a refrigerator having one or more thawing compartments.

As said, the condenser 33 need not be associated with a fan.

The controller 50 need not provide all modes of operation and all controls and settings disclosed above.

Vice versa, a food thawing cabinet according to the invention may also have a chilling or freezing mode of operation, without necessitating any structural change. Only the control of the refrigeration circuit 30 by the controller 50 needs to be adjusted to provide such additional mode of operation.

When the pressure lowering device is an expansion valve, then it may also be controlled by the controller 50.

The various disclosed features may be present individually or in any combination in a food thawing cabinet according to the invention.

The invention claimed is:

1. A thawing appliance, comprising:
a food compartment;
a refrigeration circuit comprising a cooler;
a heater switchable between at least two conditions;
an air circulating element circulating an airflow across the food compartment; and
an airflow path that passes the airflow entirely through the heater, and passes only a part of the airflow through the cooler.

2. The thawing appliance of claim 1, wherein the air circulating element is switchable between at least two conditions.

3. The thawing appliance of claim 1, wherein the refrigeration circuit is switchable between at least two conditions.

4. The thawing appliance of claim 1, wherein the airflow circulated by the air circulating element follows a same airflow path within an air processing compartment during a thawing mode and a holding mode of the appliance.

5. The thawing appliance of claim 1, wherein a portion of a suction aperture of the air circulating element faces a major face of the cooler.

6. The thawing appliance of claim 5, wherein the cooler is not centered on the air circulating element.

7. The thawing appliance of claim 6, wherein the cooler and the air circulating element each have a horizontal axis, and are mutually arranged so that only the upper part of the suction aperture of the air circulating element forces air through the cooler, while the lower part of the suction aperture of the air circulating element directly intakes the air coming from the food compartment.

8. The thawing appliance of claim 1, wherein the air circulating element is a centrifugal fan.

9. The thawing appliance of claim 8, wherein the centrifugal fan is arranged at a back wall of the appliance.

10. The thawing appliance of claim 1, wherein the air path within the food compartment is of a back-to-front air path.

11. The thawing appliance of claim 1, wherein the thawing appliance comprises a controller for controlling components of the thawing appliance.

12. The thawing appliance of claim 11, wherein the air circulation element is a variable speed fan, controlled by the controller.

13. The thawing appliance of claim 12, wherein the airflow of the fan is controllable by a pulse width modulation signal output by the controller.

14. The thawing appliance of claim 1, wherein a temperature sensor is arranged within a path of the air flow circulated by the air circulating element.

15. The thawing appliance of claim 1, comprising a displaceable fake bottom to adjust the internal volume of the food compartment to the quantity of product to be thawed and/or stored.

16. The thawing appliance of claim 1, wherein the cooler comprises an evaporator.

17. The thawing appliance of claim 1, wherein the airflow path includes a divider passing the part of the airflow through the cooler after the airflow has passed through the heater.

* * * * *